United States Patent
Björkman et al.

(10) Patent No.: US 10,787,069 B2
(45) Date of Patent: Sep. 29, 2020

(54) HYBRID POWERTRAIN WITH A GEARBOX AND METHOD TO CONTROL THE HYBRID POWERTRAIN

(71) Applicant: SCANIA CV AB, Södertälje (SE)

(72) Inventors: Mathias Björkman, Tullinge (SE);
Niklas Pettersson, Stockholm (SE);
Johan Lindström, Nyköping (SE);
Mikael Bergquist, Huddinge (SE)

(73) Assignee: SCANIA CV AB (SE)

(*) Notice: Subject to any disclaimer, the term of this patent is extended or adjusted under 35 U.S.C. 154(b) by 916 days.

(21) Appl. No.: 14/780,472

(22) PCT Filed: Mar. 20, 2014

(86) PCT No.: PCT/SE2014/050341
§ 371 (c)(1),
(2) Date: Sep. 25, 2015

(87) PCT Pub. No.: WO2014/158078
PCT Pub. Date: Oct. 2, 2014

(65) Prior Publication Data
US 2016/0059686 A1 Mar. 3, 2016

(30) Foreign Application Priority Data

Mar. 27, 2013 (SE) .................................... 1350392
Mar. 27, 2013 (SE) .................................... 1350393
Mar. 27, 2013 (SE) .................................... 1350394

(51) Int. Cl.
*B60W 20/30* (2016.01)
*B60K 1/02* (2006.01)
*B60W 20/40* (2016.01)

(52) U.S. Cl.
CPC ............... *B60K 1/02* (2013.01); *B60W 20/30* (2013.01); *B60W 20/40* (2013.01); *B60Y 2200/92* (2013.01)

(58) Field of Classification Search
CPC .......... B60K 1/02; B60W 20/30; B60W 20/40
(Continued)

(56) References Cited

U.S. PATENT DOCUMENTS

2005/0227803 A1   10/2005   Holmes
2007/0099738 A1   5/2007   Holmes
(Continued)

FOREIGN PATENT DOCUMENTS

DE   10 2008 043732 A1   6/2009
EP   1 280 677 B1   8/2004
(Continued)

OTHER PUBLICATIONS

International Search Report dated Jul. 7, 2014 issued in corresponding International patent application No. PCT/SE2014/050341.
(Continued)

*Primary Examiner* — Charles A Fox
*Assistant Examiner* — Michael E Butler
(74) *Attorney, Agent, or Firm* — Ostrolenk Faber LLP (57) ABSTRACT

A hybrid powertrain that includes a combustion engine (4) and a gearbox (2) with an input shaft (8) and an output shaft (20); a first planetary gear (10) connected to the input shaft (8); a second planetary gear (12) connected to the first planetary gear (10); a first electrical machine (14) connected to the first planetary gear (10); a second electrical machine
(Continued)

(16) connected to the second planetary gear (12); at least one gear pair (G1, 60, 72) connected to the first planetary gear (10) and to the output shaft (20); and at least one gear pair (G2, 66, 78) connected to the second planetary gear (12) and to the output shaft (20), a countershaft (18) provided between the combustion engine (4) and the gearbox (2) so that the engine (4) can be disconnected from the gearbox (2). Also disclosed is a method for controlling the disclosed hybrid powertrain (3). Also a vehicle (1) includes such a gearbox (2), and a method to control such a gearbox (2). Also a computer program (P) to control a gearbox.

12 Claims, 5 Drawing Sheets

(58) Field of Classification Search
USPC .......................................................... 701/22
See application file for complete search history.

(56) References Cited

U.S. PATENT DOCUMENTS

| | | | |
|---|---|---|---|
| 2009/0320629 | A1 | 12/2009 | Akashi et al. |
| 2014/0128193 | A1* | 5/2014 | Bergquist ............... B60K 6/365 |
| | | | 475/5 |

FOREIGN PATENT DOCUMENTS

| | | |
|---|---|---|
| EP | 1 126 987 B1 | 8/2005 |
| WO | WO 2008/046185 A1 | 4/2008 |
| WO | WO 2012/073651 A1 | 6/2012 |
| WO | WO 2014/046580 A1 | 3/2014 |

OTHER PUBLICATIONS

International Preliminary Report on Patentability dated Jun. 24, 2015 issued in corresponding International patent application No. PCT/SE2014/050341.

* cited by examiner

HYBRID POWERTRAIN WITH A GEARBOX AND METHOD TO CONTROL THE HYBRID POWERTRAIN

CROSS-REFERENCE TO RELATED APPLICATIONS

The present application is a 35 U.S.C. § 371 national phase conversion of PCT/SE2014/050341, filed Mar. 20, 2014, which claims priority to Swedish Application No. 1350394-1, filed Mar. 27, 2013, Swedish Application No. 1350392-5, filed Mar. 27, 2013 and Swedish Application No. 1350393-3, filed Mar. 27, 2013, the contents of which are incorporated herein by reference.

BACKGROUND TO THE INVENTION AND PRIOR ART

The present invention relates to a hybrid powertrain. The invention relates also to a vehicle provided with a hybrid powertrain, a method for controlling a hybrid powertrain, a computer program to enable performance of a method for controlling a hybrid powertrain, and a computer program product comprising a computer readable medium having stored therein program code to enable the performance of the method by a computer.

Hybrid vehicles may be powered by a primary drive means which may be a combustion engine, and by a secondary drive means which may be an electrical machine. The electrical machine will be equipped with at least one energy store, e.g. an electrochemical store for electrical energy, and with regulating equipment to regulate the flow of electrical energy between the energy store and the electrical machine. The electrical machine may thus serve alternately as a motor and a generator, depending on the vehicle's operating state. When the vehicle is braked, the electrical machine will generate electrical energy which goes into the energy store. This is usually called regenerative braking whereby the vehicle is braked by the electrical machine and the combustion engine. The stored electrical energy will subsequently be used for operation of the vehicle.

A planetary gear usually comprises three components arranged for rotation relative to one another, via a sunwheel, a planet wheel carrier and a ring gear. Knowing the number of teeth which the sunwheel and the ring gear have makes it possible to determine the mutual rotation speeds of the three components during operation. One of the planetary gear's components may be connected to an output shaft of a combustion engine. This component of the planetary gear will therefore rotate at a speed corresponding to that of the engine output shaft. A second component of the planetary gear may be connected to an input shaft of a gearbox. This component of the planetary gear will therefore rotate at the same speed as the gearbox input shaft. A third component of the planetary gear is connected to a rotor of an electrical machine to achieve hybrid operation. This component of the planetary gear will therefore rotate at the same speed as the electrical machine's rotor if they are connected directly to one another. Alternatively, the electrical machine may be connected to the third component of the planetary gear via a transmission which has a gear ratio, in which case they may rotate at different speeds. The speed and/or the torque of electrical machines may be regulated steplessly. In operating situations where a desired speed and/or torque are to be imparted to the gearbox input shaft, a control unit will use knowledge of the combustion engine's speed to calculate the speed at which the third component needs to be driven to cause the gearbox input shaft to rotate at the desired speed. A control unit will activate the electrical machine to impart the calculated speed to the third component and hence the desired speed to the gearbox input shaft.

During acceleration of the vehicle an increased torque has to be delivered from the combustion engine and the electrical machine to the gearbox and thence to the vehicle's tractive wheels. As both the combustion engine and the electrical machine are connected to the planetary gear, the largest possible torque delivered by them will be limited by whichever of their greatest torques is less than that of the other, taking into account the gear ratio between them. In situations where the greatest torque of the electrical machine is less than the greatest torque of the combustion engine, taking into account the gear ratio between them, the electrical machine will not be able to generate sufficient reaction torque to the planetary gear, with the result that the combustion engine will not be able to transmit its greatest torque to the gearbox and thence to the vehicle's tractive wheels. The greatest torque transferrable to the gearbox is thus limited by the capacity of the electrical machine. This is also indicated by the so-called planet equation.

The space available for the propulsion device in a vehicle is often limited. If the propulsion device comprises a plurality of components (e.g. a combustion engine, an electrical machine, a gearbox and a planetary gear) the configuration needs to be compact. If further components (e.g. a regenerative brake device) are to be incorporated, the need for a compact configuration of the components of the propulsion device will be still greater. At the same time, the dimensions of these components have to enable them to absorb necessary forces and torques.

Certain types of vehicles, particularly heavy trucks and buses, need a large number of gearsteps. This increases the number of components in the gearbox, which has to be dimensioned to absorb large forces and torques that occur in such heavy vehicles, thereby increasing its size and weight.

The components of the propulsion device are also required to be of high reliability and high operational safety. A gearbox that comprises disc clutches is subject to wear which affects its reliability and service life.

During regenerative braking, kinetic energy is converted to electrical energy which goes into an energy store, e.g. accumulators. A factor which affects the service life of the energy store is its number of cycles of supplying current to and absorbing current from the electrical machines. The more numerous the cycles, the shorter the energy store's service life.

In certain operating conditions it is desirable to switch the combustion engine off with the object of saving fuel and with a view to preventing cooling of its exhaust post-treatment system. When the hybrid powertrain is part of a vehicle, the vehicle will be driven by the electrical machines. In a hybrid powertrain, problems may arise if the electrical machines alone are activated. If the crankshaft of the combustion engine is driven by the electrical machines without the engine being activated, excessive wear of the engine's bearings may occur.

EP-B1-1126987 discloses a gearbox with dual planetary gears. The sunwheel of each planetary gear is connected to an electrical machine and the ring gears of the planetary gears are connected to one another. The planet wheel carriers of each planetary gear are connected to a number of pairs of gears in such a way as to provide an infinite number of gearsteps. Another specification, EP-B1-1280677, also discloses how the planetary gears may be bridged by a gearstep provided on the output shaft of the combustion engine.

US-A1-20050227803 discloses a vehicle transmission with two electrical machines which are connected to respective sunwheels of two planetary gears. The planetary gears have a common planet wheel carrier connected to the input shaft of the transmission.

WO2008/046185-A1 discloses a hybrid transmission with two planetary gears whereby an electrical machine is connected to one of the planetary gears and a double clutch cooperates with the other planetary gear. The two planetary gears also cooperate with one another via a gearwheel transmission.

SUMMARY OF THE INVENTION

Despite known solutions in this field, there is a need to further develop a hybrid powertrain and a method for controlling such a hybrid powertrain in order to optimize the fuel consumption of the hybrid powertrain. There is in particular a need to further develop a hybrid powertrain and a method for controlling it which makes electric drive possible in a simple way.

The object of the invention is to propose a novel and advantageous hybrid powertrain which makes electric drive possible in a simple way.

Another object of the invention is to propose a novel and advantageous method for controlling a hybrid powertrain.

A further object of the invention is to propose a novel and advantageous computer program for controlling a hybrid powertrain.

These objects are achieved with the claimed hybrid powertrain.

These objects are also achieved with the claimed vehicle.
These objects are also achieved with the claimed method.
These objects are also achieved with a computer program for controlling the claimed hybrid powertrain.

These objects are also achieved with a computer program product for controlling the claimed hybrid powertrain.

The hybrid powertrain according to the present invention comprises a gearbox and a combustion engine connected to the gearbox. The gearbox itself comprises an input and an output shaft, a first planetary gear connected to the input shaft, a second planetary gear connected to the first planetary gear, a first electrical machine connected to the first planetary gear, a second electrical machine connected to the second planetary gear, at least one gear pair connected to the first planetary gear and to the output shaft and at least one gear pair connected to the second planetary gear and to the output shaft. The hybrid powertrain provided with a clutch device situated between the combustion engine and the gearbox makes it possible for the combustion engine to be disconnected from the gearbox and for the hybrid powertrain to be driven electrically by the first and the second electrical machine.

The combustion engine may be disconnected with the object of saving fuel or to prevent cooling of its exhaust post-treatment system. It is important that the engine output shaft be as motionless as possible during electric drive. If torque is transferred to the engine when it is switched off, there is risk of its shafts moving against bearings with no oil supply, potentially causing destruction of the bearings. According to the present invention, the engine output shaft is allowed to be motionless by the clutch device being situated between it and the gearbox. Thus, when the clutch device is open, the engine will be disconnected from the gearbox, and when the clutch device is closed, the engine will be connected to the gearbox.

During electric drive there is less need for gear changes in that the first and second electrical machines each have a larger speed range within which they work more efficiently than the combustion engine. Both of the electrical machines are preferably used to propel the vehicle during electric drive, resulting in a large number of possible combinations of different gearsteps.

Changing gear during electric drive always entails the torque contribution from one electrical machine having to be reduced during changes in order to be able to connect/disconnect any desired gear pair to/from a countershaft connected to the output shaft and thereby engage a gear.

The first planetary gear comprises with advantage a first planet wheel carrier connected to a second sunwheel of the second planetary gear. In addition, a first sunwheel of the first planetary gear is firmly connected to a first mainshaft, and a second planet wheel carrier of the second planetary gear is firmly connected to a second mainshaft. The first planet wheel carrier is preferably connected to the gearbox input shaft.

Advantageously, the clutch device is situated between the engine output shaft and the first planetary gear. Advantageously, the clutch device is situated between the engine output shaft and the first planet wheel carrier. The clutch device is preferably situated between the engine output shaft and the gearbox input shaft.

The gearbox is preferably provided with a number of gear pairs that comprise gearwheels which can be mechanically locked to and disconnected from a countershaft, resulting in a number of fixed gearsteps that can be changed without torque breaks. The gearwheels lockable to the countershaft also result in a compact configuration with high reliability and high operational safety. Alternatively, pinions which form part of gear pairs may be arranged to be lockable to and disconnectable from the first or the second mainshaft.

The gear pairs will each have a gear ratio adapted to the vehicle's desired operating characteristics. Advantageously, the gear pair with the highest ratio relative to the other pairs will be connected when the lowest gear is engaged.

Advantageously, a countershaft situated between the respective first and second planetary gears and the output shaft is connected to at least one gear pair connected to the first planetary gear and the at least one gear pair connected to the second planetary gear. Advantageously, the countershaft is connected to the output shaft via a fifth gear pair. The fact that the at least one gear pair connected to the first planetary gear and the at least one gear pair connected to the second planetary gear are connected to the countershaft may mean that these gear pairs are arranged to be lockable to and disconnectable from the countershaft. An alternative is that the at least one gear pair connected to the first planetary gear be arranged to be lockable to and disconnectable from the first mainshaft and that the at least one gear pair connected to the second planetary gear be arranged to be lockable to and disconnectable from the second mainshaft.

Advantageously, a clutch mechanism is provided between the first mainshaft and the output shaft.

Providing the gearbox, which comprises two planetary gears connected to one another, with a shift element situated between a countershaft and the gearbox output shaft results in a number of gearsteps whereby torque from one planetary gear may be transferred to the countershaft and thence to a mainshaft connected to the second planetary gear in order to finally transfer torque to the gearbox output shaft.

The electrical machines connected to the planetary gears may generate current and/or impart torque, depending on the desired operating states. In certain operating situations, they may also provide each other with current.

In one embodiment the hybrid powertrain is provided with a number of gear pairs comprising gearwheels, which are lockable mechanically to the countershaft and also result in a compact configuration with high reliability and high operational safety.

In one embodiment, a first clutch unit and a second clutch unit are provided between the planet wheel carrier and the sunwheel of each planetary gear. The purpose of these clutch units is to lock each planet wheel carrier to the respective sunwheel. When the planet wheel carrier and the sunwheel are connected to one another, the power from the combustion engine will pass through the planet wheel carrier, the clutch unit, the sunwheel and thence to the gearbox, with the result that the planet wheels absorb no torque. This makes it possible for the dimensions of the planet wheels to be appropriate solely to the electrical machine's torque instead of the combustion engine's torque, making it possible for these wheels to be of smaller dimensions. The result is a propulsion device according to the invention which is of compact configuration, low weight and low manufacturing cost.

The clutch units and the locking mechanisms preferably comprise an annular sleeve which is moved axially between connected and disconnected positions. The sleeve surrounds the rotating components of the gearbox substantially concentrically and is moved between the connected and disconnected positions by a power element. The result is a compact configuration with low weight and low manufacturing cost.

A method for controlling the hybrid powertrain preferably comprises the steps of causing the combustion engine to be disconnected by a clutch device; disconnecting rotatable components of the second planetary gear from one another; connecting the gear pair which is connected to the first planetary gear; disconnecting the gear pair which is connected to the second planetary gear; and connecting two rotatable components of the second planetary gear to one another.

A method for controlling the hybrid powertrain preferably comprises the steps of causing the combustion engine to be disconnected by a clutch device; disconnecting rotatable components of the first planetary gear from one another; connecting a gear pair which is connected to the second planetary gear; disconnecting a gear pair which is connected to the first planetary gear; and connecting two rotatable components of the first planetary gear to one another.

To be able to disconnect a planetary gear's planet wheel carrier and sunwheel from one another, the hybrid powertrain is controlled in such a way that torque balance occurs in the planetary gear. Torque balance means a state in which a ring gear that is part of the respective planetary gear is acted upon by a torque which corresponds to the product of the torque acting upon the planetary gear's planet wheel carrier and the gear ratio of the planetary gear while at the same time the planetary gear's sunwheel is acted upon by a torque corresponding to the product of the torque acting upon the planet wheel carrier and the gear ratio of the planetary gear. In the situation where two of the planetary gear's constituent parts (sunwheel, ring gear and planet wheel carrier) are connected together by a clutch unit, the clutch unit will transfer no torque between the planetary gear's parts when there is torque balance. The clutch unit may thus easily be moved and the planetary gear's constituent parts be disconnected.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
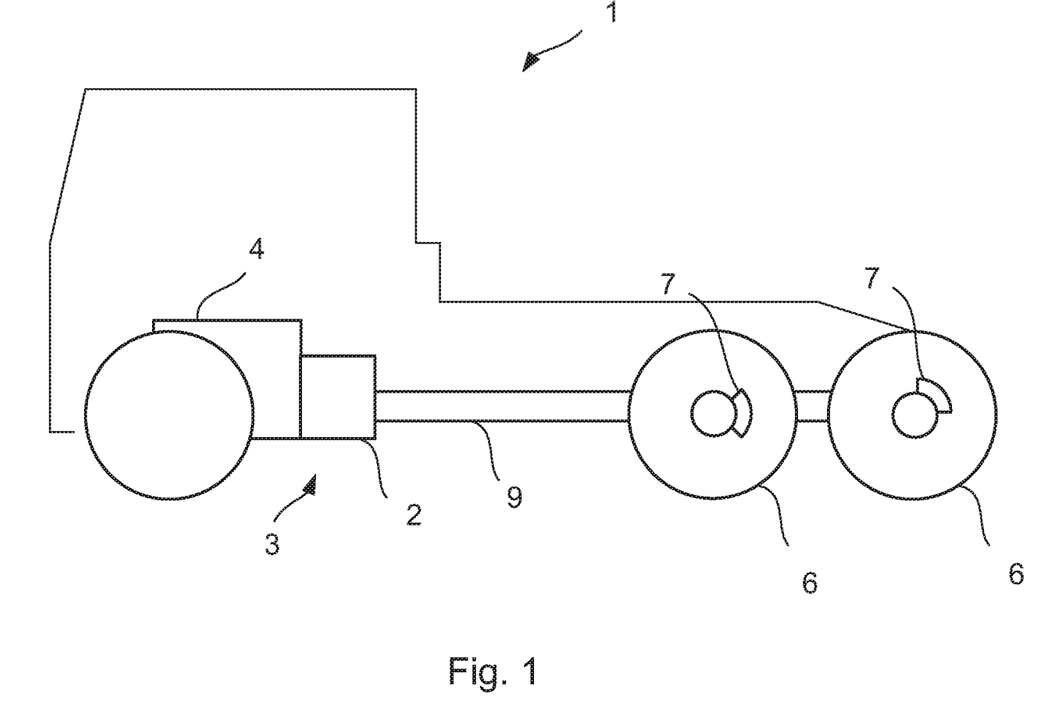
FIG. 1 depicts schematically a vehicle in side view with a hybrid powertrain according to the present invention.

FIG. 1 is a schematic sideview of a vehicle 1 provided with a gearbox 2 and a combustion engine 4 which form part of a hybrid powertrain 3. The engine 4 is connected to the gearbox 2 which is itself further connected to the vehicle's tractive wheels 6 via a propeller shaft 9. The tractive wheels are provided with brake devices 7 for braking the vehicle.

Figure 2:
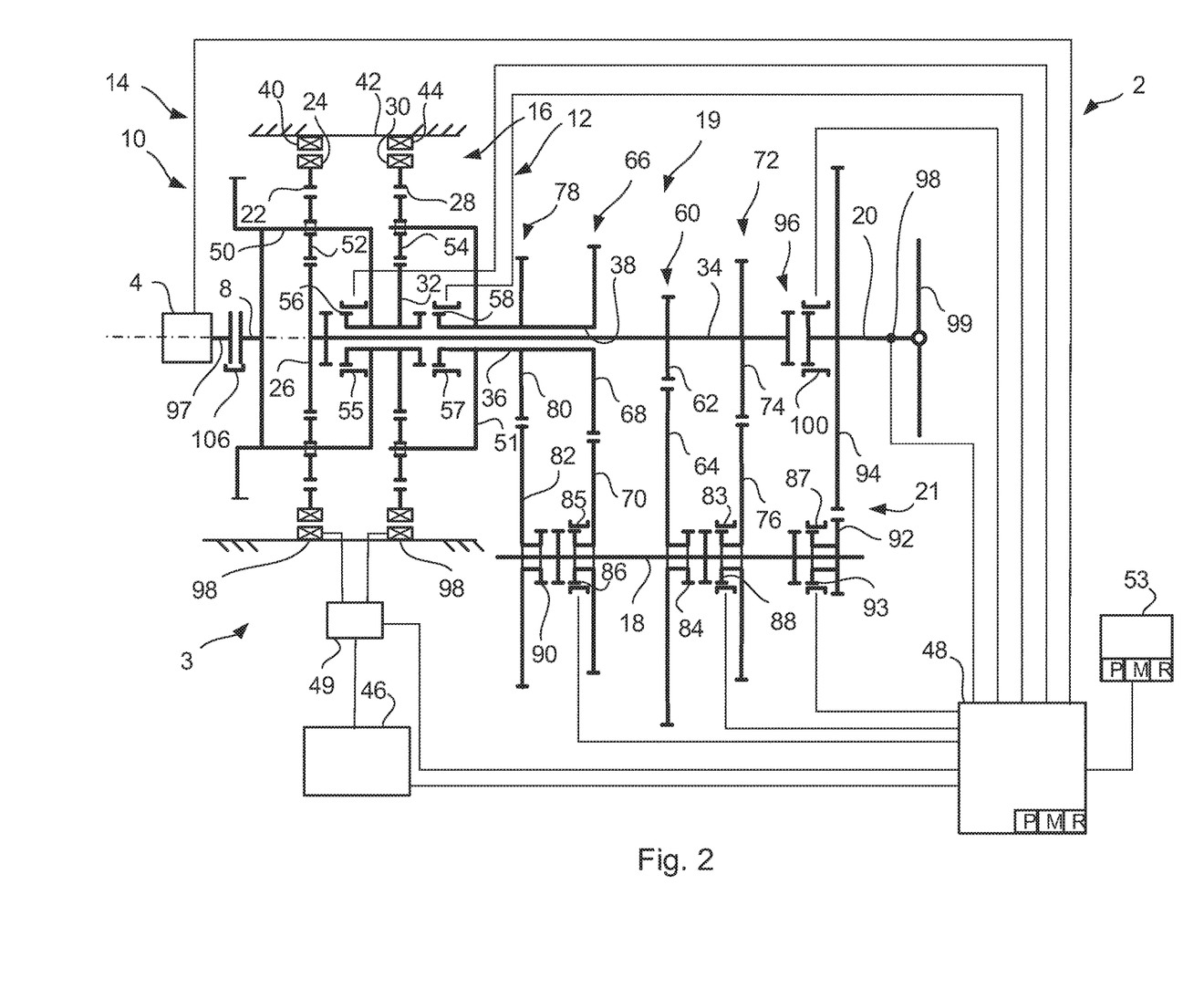
FIG. 2 is a schematic sideview of a hybrid powertrain with a gearbox according to the present invention.

FIG. 2 is a schematic sideview of a hybrid powertrain 3 with a gearbox 2, which comprises an input shaft 8, respective first and second planetary gears 10 and 12, respective first and second electrical machines 14 and 16, a countershaft 18 and an output shaft 20. The first planetary gear 10 has a first ring gear 22 to which a first rotor 24 of the first electrical machine 14 is connected. The first planetary gear has also a first sunwheel 26. The second planetary gear 12 has a second ring gear 28 to which a second rotor 30 of the second electrical machine 16 is connected. The second planetary gear has a second sunwheel 32. The first and second sunwheels 26 and 32 are arranged coaxially, which in the version depicted causes a first mainshaft 34 attached to the first sunwheel 26 to extend within a second mainshaft 36 which is attached to the second sunwheel 32 and is provided with a central bore 38. It is also possible for the first mainshaft 34 to be arranged parallel with and alongside the second mainshaft 36.

The first electrical machine 14 is provided with a first stator 40 connected to the vehicle via a gear housing 42 which surrounds the gearbox 2. The second electrical machine 16 is provided with a second stator 44 connected to the vehicle via the gear housing 42 which surrounds the gearbox. The respective first and second electrical machines 14 and 16 are connected to an energy store 46, e.g. a battery, which energises them in certain operating states of the vehicle. In other operating states, the electrical machines may serve as generators, in which case current will be supplied to the energy store. An electronic control unit 48 is connected to the energy store and controls the supply of current to the electrical machines. The energy store is preferably connected to the electrical machines via a changeover switch 49 which is connected to the control unit 48. In certain operating situations the electrical machines may also drive one another, in which case electrical energy passes from one to the other via the changeover switch connected to them. This makes it possible to achieve a power balance between the electrical machines. Another computer 53 may also be connected to the control unit 48 and the gearbox 2.

The first planetary gear 10 is provided with a first planet wheel carrier 50, which supports a first set of planet wheels 52. The second planetary gear 12 is provided with a second planet wheel carrier 51, which supports a second set of planet wheels 54. The first set of planet wheels 52 cooperates with the first ring gear 22 and the first sunwheel 26. The second set of planet wheels 54 cooperates with the second ring gear 28 and the second sunwheel 32. The gearbox input shaft 8 is connected to the first planet wheel carrier 50. The combustion engine 4 is connected to the gearbox 2 by a clutch device 106 situated between the engine output shaft 97 and the gearbox input shaft 8. The clutch device may be opened to disconnect the combustion engine from the clutch device and thereby enable the vehicle to be driven electrically by the two electrical machines. The clutch device may take the form of splined portions which cooperate with a shift sleeve. It may alternatively take the form of a friction clutch.

A first clutch unit 56 is provided between the first sunwheel 26 and the first planet wheel carrier 50. Applying the first clutch unit so that the first sunwheel 26 and the first planet wheel carrier are connected together and therefore cannot rotate relative to one another will cause them to rotate at the same speed.

A second clutch unit 58 is provided between the second sunwheel 32 and the second planet wheel carrier 51. Applying the second clutch unit so that the second sunwheel and the second planet wheel carrier are connected together and therefore cannot rotate relative to one another will cause them rotate at the same speed.

The first and second clutch units 56, 58 preferably have respective first and second splined shift sleeves 55 and 57 which are movable axially relative to a splined portion of the respective first and second planet wheel carriers 50 and 51 and relative to a splined portion of the respective sunwheels 26 and 32. Moving the respective shift sleeves 55, 57 so that the splined portions are connected via them will respectively cause the first planet wheel carrier 50 and the first sunwheel 26, and the second planet wheel carrier 51 and the second sunwheel 32, to become locked together and unable to rotate relative to one another.

In the version depicted in FIG. 2, the first clutch unit 56 is situated between the first sunwheel 26 and the first planet wheel carrier 50, and the second clutch unit 58 is situated between the second sunwheel 28 and the second planet wheel carrier 51. It is possible, however, for there to be a further or alternative clutch unit (not depicted) between the first ring gear 22 and the first planet wheel carrier 50, and also for there to be a further or alternative clutch unit (not depicted) between the second ring gear 28 and the second planet wheel carrier 51.

A transmission device 19 comprising a first gear pair 60 situated between the first planetary gear 10 and the output shaft 20 is connected to the first and the second mainshafts 34, 36. The first gear pair 60 comprises a first pinion 62 and a first gearwheel 64 in engagement with one another. A second gear pair 66 situated between the second planetary gear 12 and the output shaft 20 comprises a second pinion 68 and a second gearwheel 70 in mutual engagement. A third gear pair 72 situated between the first planetary gear 10 and the output shaft 20 comprises a third pinion 74 and a third gearwheel 76 in mutual engagement. A fourth gear pair 78 situated between the second planetary gear 12 and the output shaft 20 comprises a fourth pinion 80 and a fourth gearwheel 82 in mutual engagement.

The respective first and third pinions 62 and 74 are situated on and firmly connected to the first mainshaft 34 so that they cannot rotate relative to it. The respective second and fourth pinions 68 and 80 are situated on and firmly connected to the second mainshaft 36 so that they cannot rotate relative to it.

The countershaft 18 extends substantially parallel with the first and second mainshafts 34 and 36. The first, second, third and fourth gearwheels 64, 70, 76 and 82 are supported by the countershaft. The first pinion 62 engages with the first gearwheel 64, the second pinion 68 with the second gearwheel 70, the third pinion 74 with the third gearwheel 76, and the fourth pinion 80 with the fourth gearwheel 82.

The first, second, third and fourth gearwheels 64, 70, 76 and 82 can individually be locked to and disconnected from the countershaft 18 by respective first, second, third and fourth clutch elements 84, 86, 88 and 90. These clutch elements preferably take the form of splined portions formed on the respective gearwheels 64, 70, 76 and 82 and on the countershaft and cooperating with fifth and sixth shift sleeves 83, 85, which engage mechanically with the splined portions of the first to fourth gearwheels 64, 70, 76 and 82 and the countershaft 18. The first and third clutch elements 84, 88 are preferably provided with a common shift sleeve 83, and the second and fourth clutch elements 86, 90 are preferably provided with a common shift sleeve 85. In the disconnected state, relative rotation may occur between the respective gearwheels 64, 70, 76 and 82 and the countershaft 18. The clutch elements 84, 86, 88 and 90 may also take the form of friction clutches. The countershaft 18 bears also a fifth gearwheel 92 which engages with a sixth gearwheel 94 situated on the gearbox output shaft 20.

The countershaft 18 is situated between the respective first and the second planetary gears 10, 12 and the output shaft 20 in such a way that it is connected to the output shaft via a fifth gear pair 21, which comprises the fifth and sixth gearwheels 92, 94. The fifth gearwheel 92 is arranged to be connectable to and disconnectable from the countershaft by a fifth clutch element 93.

By disconnecting the fifth gearwheel 92 which is situated disconnectably on the countershaft 18 it is possible to transfer torque from the second planetary gear 12 to the countershaft 18, e.g. via the second gear pair 66, and to further transfer torque from the countershaft 18 to the output shaft 20, e.g. via the first gear pair 60. The result is a number of gearsteps whereby torque from either of the planetary gears 10, 12 may be transferred to the countershaft 18 and thence to whichever mainshaft 34, 36 is connected to the other planetary gear 10, 12, in order finally to transfer torque to the gearbox output shaft 20. This does, however, presuppose that a clutch mechanism 96 situated between the first mainshaft 34 and the output shaft 20 is connected, as described in more detail below.

The fifth gearwheel 92 may be locked to and disconnected from the countershaft 18 by a fifth clutch element 93. The clutch element 93 preferably takes the form of splined portions formed on the fifth gearwheel 92 and on the countershaft 18 and cooperating with a ninth shift sleeve 87, which engages mechanically with the splined portions of the fifth gearwheel 92 and of the countershaft 18. In the disconnected state, relative rotation may occur between the fifth gearwheel 92 and the countershaft 18. The fifth clutch element 93 may also take the form of friction clutches.

Torque transfer from the gearbox input shaft 8 to the gearbox output shaft 20 may take place via the respective first or second planetary gear 10 or 12 and the countershaft 18. It may also take place directly via the first planetary gear 10, which has its first sunwheel 26 connected via the first mainshaft 34 to the gearbox output shaft 20 via a clutch mechanism 96. The clutch mechanism 96 comprises preferably a splined seventh shift sleeve 100 which is movable axially on the splined portions of the first mainshaft 34 and of the output shaft 20. Moving the seventh shift sleeve 100 so that the splined portions connect via it will lock the first mainshaft 34 to the output shaft 20, which will therefore both rotate at the same speed. By disconnecting the fifth gearwheel 92 of the fifth gear pair 21 from the countershaft 18 it is possible for torque from the second planetary gear 12 to be transferred to the countershaft 18 and thence to the first mainshaft 34 connected to the first planetary gear 10 in order, via the clutch mechanism 96, to finally transfer torque to the gearbox output shaft 20.

During operation, the gearbox 2 may in certain situations operate in such a way that one of the sunwheels 26 and 32 is locked to the respective first or second planet wheel carrier 50 or 51 by the respective first or second clutch unit 56 or 58. The respective first or second mainshaft 34 or 36 will then rotate at the same speed as the gearbox input shaft 8, depending on which of the sunwheels 26 and 32 is locked to the respective planet wheel carrier. One or both of the electrical machines 14 and 16 may serve as generators to supply electrical energy to the energy store 46. Alternatively, the respective electrical machine may provide a torque contribution to increase the torque on the output shaft 20. In certain operating situations the electrical machines will provide each other with electrical energy independently of the energy store 46.

It is also possible for both of the electrical machines 14 and 16 to simultaneously generate current to the energy store 46. During engine braking, the driver releases the vehicle's accelerator pedal (not depicted). The gearbox output shaft 20 then drives one or both of the electrical machines 14, 16 while at the same time the combustion engine 4 and the electrical machines 14, 16 apply engine braking. The electrical machines 14, 16 here generate electrical energy which goes into the vehicle's energy store 46. This operating state is called regenerative braking. The engine output shaft 97 is disconnected so as to become independent of the engine's idling speed during braking. This means that one or both of the electrical machines 14 and 16 will serve as brakes and generate electrical energy which goes into the energy store 46.

The control unit 48 is connected to the electrical machines 14 and 16 and adapted to causing them in certain appropriate operating situations to use stored electrical energy for imparting driving force to the gearbox output shaft 20, and in other operating situations to use the kinetic energy of the gearbox output shaft 20 to gain and store electrical energy. The control unit 48 therefore monitors the speed and/or torque of the engine output shaft 97 via sensors 98 associated with the electrical machines 14, 16, and the speed and/or torque of the gearbox output shaft 20, in order thereby to obtain information and cause the electrical machines 14, 16 to serve as electric motors or generators. The control unit 48 may be a computer with suitable software for this purpose. It will also control the flow of electrical energy between the energy store 46 and the respective stators 40 and 44 of the electrical machines 14, 16. In situations where the electrical machines 14, 16 serve as motors, stored electrical energy is supplied from the energy store 46 to the stators. In situations where the electrical machines 14, 16 serve as generators, electrical energy is supplied from the stators to the energy store 46. As mentioned above, however, the electrical machines 14, 16 may in certain operating situations provide each other with electrical energy independently of the energy store 46.

The first and second clutch units 56 and 58, the first, second, third, fourth and fifth clutch elements 84, 86, 88, 90 and 93, the clutch mechanism 96 between the first mainshaft 34 and the output shaft 20, and the locking device 102 between the first planet wheel carrier 50 and the gear housing 42, are connected to the control unit 48 via their respective shift sleeves, which are preferably activated and deactivated by electrical signals from the control unit 48. The shift sleeves are preferably moved by undepicted power means, e.g. by hydraulic or pneumatic cylinders. It is also possible for them to be moved by electrically operated power means.

In the example depicted in FIG. 2 there are four pinions 62, 68, 74 and 80, four gearwheels 64, 70, 76 and 82 and two planetary gears 10 and 12 with associated electrical machines 14 and 16. It is possible, however, for the gearbox to be provided with more or fewer pinions and gearwheels and with more planetary gears with associated electrical machines.

As described above, torque from the gearbox 2 is extracted from the output shaft 20. It is also possible for it to be extracted directly from the first or the second mainshaft 34, 36 or directly from the countershaft 18. It may also be extracted in parallel from two or all three of the shafts 18, 34, 36 at the same time.

A shift from a first gear to a sixth gear is described below in a case where the hybrid powertrain 3 is part of a vehicle 1. The first planet wheel carrier 50 and the first sunwheel 26 are connected together by the first clutch unit 56. In addition, the second planet wheel carrier 51 and the second sunwheel 32 are connected together by the second clutch unit 58. The clutch unit 106 is open and the combustion engine 4 is therefore disconnected and the vehicle is propelled by the two electrical machines 14, 16.

In a first gear, the gear pairs 60, 72 connected to the first planetary gear 10 are disconnected from the countershaft 18 while at the same time the fourth gear pair 78 is connected to the countershaft 18. Thus the fourth gearwheel 82 is connected to the countershaft 18 by the fourth clutch element 90. The fifth gear pair 21 is connected to the countershaft 18.

The first, second, third and fourth gear pairs 60, 66, 72, 78 each have a ratio appropriate to the vehicle's desired operating characteristics. In the embodiment example in FIG. 2, the fourth pair 78 has a higher ratio than the first, second and third pairs 60, 66, 72, so it will be connected when the lowest gear is engaged. Like the fourth pair, the second gear pair 66 transfers torque between the second mainshaft 36 and the countershaft 18 and might instead have a higher ratio than the other pairs 60, 72, 78, in which case it would therefore be connected when the lowest gear is engaged.

To shift to a second gear, the two electrical machines 14, 16 are operated in such a way that torque balance occurs in the second planetary gear 12. Thereafter the second clutch unit 58 is moved so that the second planet wheel carrier 51 and the second sunwheel 32 are disconnected from one another. The first electrical machine 14 is then operated in such a way that a synchronous speed is reached between the countershaft 18 and the first gear pair 60, which means that a synchronous speed occurs between the first gearwheel 64 and the countershaft 18. Thereafter the first gearwheel 64 is connected to the countershaft 18 by the first clutch element 84. The two electrical machines 14, 16 are then operated in such a way that a torque-free state occurs between the countershaft 18 and the fourth gearwheel 82, followed by the fourth clutch element 90 being moved so that the fourth gearwheel 82 and hence the fourth gear pair 78 are disconnected from the countershaft 18. Finally, the second electrical machine 16 is operated in such a way that a synchronous speed is reached in the second planetary gear 12, followed by the second planet wheel carrier 52 and the second sunwheel 32 being connected together by the second clutch unit 58. The vehicle will now be running in a second gear.

To shift from a first to a third gear, the two electrical machines 14, 16 are operated in such a way that torque balance occurs in the first planetary gear 10. Thereafter the first clutch unit 56 is moved so that the first planet wheel carrier 50 and the first sunwheel 26 are disconnected from one another. The second electrical machine 16 is then operated in such a way that a synchronous speed is reached between the countershaft 18 and the second gear pair 66, which means that a synchronous speed occurs between the second gearwheel 70 and the countershaft 18. Thereafter the second gearwheel 70 is connected to the countershaft 18 by the second clutch element 86. The two electrical machines 14, 16 are then operated in such a way that a torque-free state occurs between the countershaft and the first gearwheel 64, followed by the first clutch element 84 being moved so that the first gearwheel 64 and hence the first gear pair 60 are disconnected from the countershaft 18. Finally, the first electrical machine 14 is operated in such a way that a synchronous speed is reached in the first planetary gear 10, followed by the first planet wheel carrier 50 and the first sunwheel 26 being connected together by the first clutch unit 56. The vehicle will now be running in a first gear.

To shift from a third gear to a fourth gear, the two electrical machines 14, 16 are operated in such a way that torque balance occurs in the second planetary gear 12. Thereafter the second clutch unit 58 is moved so that the second planet wheel carrier 51 and the second sunwheel 32 are disconnected from one another. The first electrical machine 14 is then operated in such a way that a synchronous speed is reached between the countershaft 18 and the third gear pair 72, which means that a synchronous speed occurs between the third gearwheel 76 and the countershaft 18. Thereafter the third gearwheel 76 is connected to the countershaft 18 by the third clutch element 88. The two electrical machines 14, 16 are then operated in such a way that a torque-free state occurs between the countershaft 18 and the second gearwheel 70, followed by the second clutch element 86 being moved so that the second gearwheel 70 and hence the second gear pair 66 are disconnected from the countershaft 18. Finally, the second electrical machine 16 is operated in such a way that a synchronous speed is reached in the second planetary gear 12, followed by the second planet wheel carrier 51 and the second sunwheel 32 being connected together by the second clutch unit 58. The vehicle will now be running in a fourth gear.

To change from a fourth to a sixth gear, the two electrical machines 14, 16 are operated in such a way that torque balance occurs in the second planetary gear 12. Thereafter the second clutch unit 58 is moved so that the second planet wheel carrier 51 and the second sunwheel 32 are disconnected from one another. Thereafter the second electrical machine 16 is operated in such a way that a synchronous speed is reached between the countershaft 18 and the second gear pair 66 or the fourth gear pair 78. Thereafter the second gearwheel 70 is connected to the countershaft 18 by the second clutch element 86, or the fourth gearwheel 82 is connected to the countershaft 18 by the fourth clutch element 90. Thereafter the two electrical machines 14, 16 are operated in such a way that a torque-free state occurs between the countershaft 18 and the third gearwheel 76, followed by the third clutch element 88 being moved so that the third gearwheel 76 and hence the third gear pair 72 are disconnected from the countershaft 18. The first electrical machine 14 is then operated in such a way that a synchronous speed is reached between the first mainshaft 34 and the output shaft 20, followed by the clutch mechanism 96 being used to connect the first mainshaft 34 to the output shaft 20. In addition, the two electrical machines 14, 16 are operated in such a way that a torque-free state occurs between the countershaft 18 and the previously connected second or fourth gear pair 66, 78, followed by the second or fourth clutch element 86, 90 being moved so that the second or fourth gear pair 66, 78 is disconnected from the countershaft 18. Thereafter the second electrical machine 16 is operated in such a way that a torque-free state occurs between the fifth gear pair 21 and the countershaft 18. When a torque-free state is reached, the fifth clutch element 93 is disengaged and the fifth gear pair 21 is disconnected from the countershaft 18. Finally the second electrical machine 16 is operated in such a way that a synchronous speed is reached in the second planetary gear 12, followed by the second planet wheel carrier 51 and the second sunwheel 32 being connected together by the second clutch unit 58.

Figure 3:
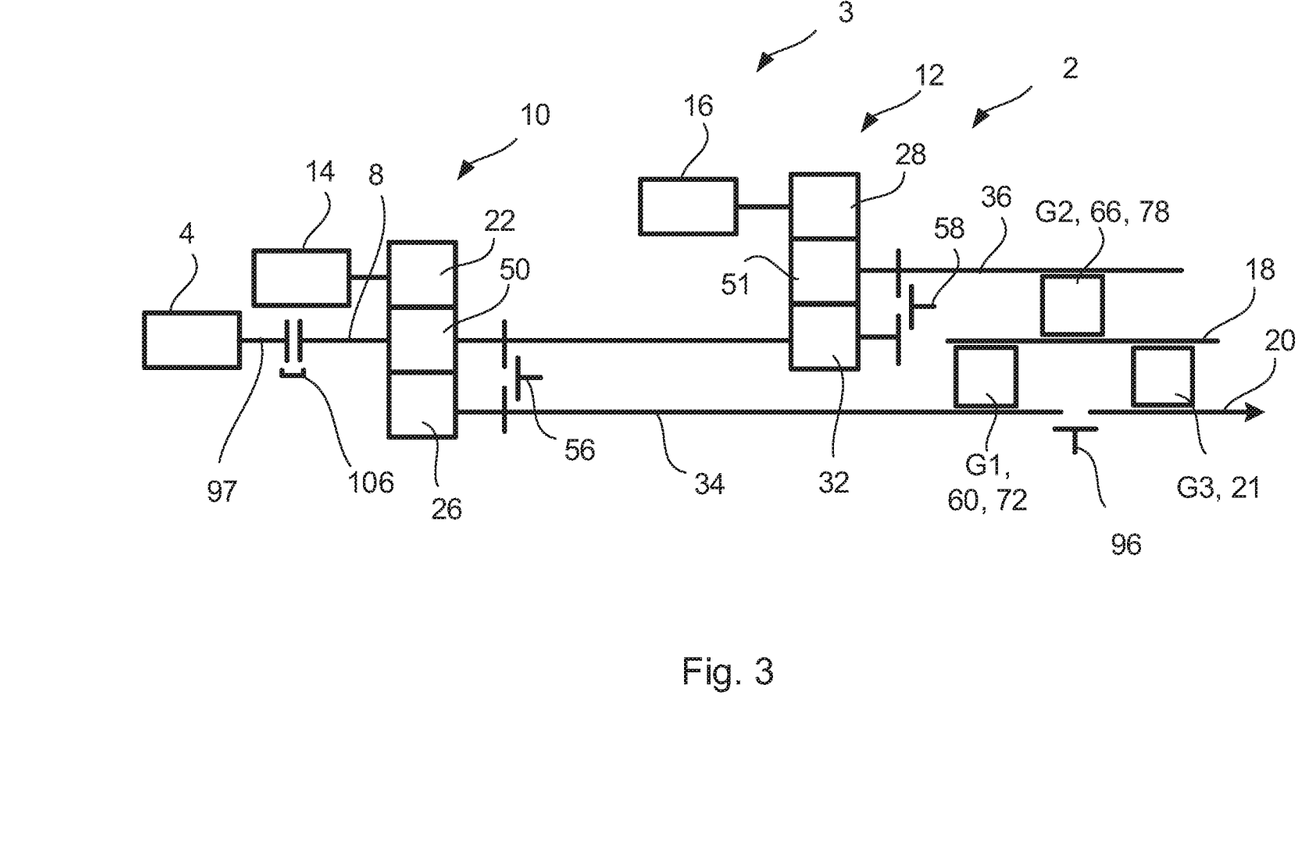
FIG. 3 is a simplified schematic view of the hybrid powertrain in FIG. 2.

FIG. 3 illustrates the hybrid powertrain 3 of FIG. 2 in a simplified view in which certain components have been omitted for the sake of clarity. G1 in FIG. 3 takes the form of at least one gear pair connected to the first mainshaft 34 and thereby to the first planetary gear 10, and G2 takes the form of at least one gear pair connected to the second mainshaft 36 and thereby to the second planetary gear 12. These gear pairs G1, G2 are also connected to the output shaft 20 via the countershaft 18. G1 and G2 may each comprise one or more gear pairs. The gear pair G1 connected to the first planetary gear 10 may for example comprise the first gear pair 60 and/or the third gear pair 72, as described with reference to FIG. 2. The gear pair G2 connected to the second planetary gear 12 may for example comprise the second gear pair 66 and/or the fourth gear pair 78, as described with reference to FIG. 2. Also depicted is at least one gear pair G3 which is connected to the output shaft 20 and the countershaft 18 and may take the form of the fifth gear pair 21 described with reference to FIG. 2. G3 may comprise one or more gear pairs.

Embodiments for controlling the hybrid powertrain 3 are described below. The first planet wheel carrier 50 and the first sunwheel 26 are connected together by the first clutch unit 56. In addition, the second planet wheel carrier 51 and the second sunwheel 32 are connected together by the second clutch unit 58. The clutch unit 106 is open, so the combustion engine is disconnected and the hybrid powertrain is driven by the two electrical machines. At least one gear pair G3 connected to the countershaft 18 and to the output shaft 20 is preferably connected and locked to the countershaft 18 so that the torque from the two electrical machines 14, 16 is transferred to the output shaft 20 via the countershaft 18 and the gear pair G3.

In one embodiment an upshift from one gear to another is effected by the hybrid powertrain being caused to disconnect the second planet wheel carrier 51 and the second sunwheel 32. This is achieved by operating the two electrical machines in such a way that torque balance occurs in the second planetary gear 12. Thereafter the second clutch unit 58 is moved so that the second planet wheel carrier 51 and the second sunwheel 32 are disconnected from one another.

In addition, the first electrical machine 14 is operated in such a way that a synchronous speed is reached between the countershaft 18 and a gear pair G1 which is connected to the first planetary gear 10, followed by the gear pair G1 connected to the first planetary gear 10 being connected to the countershaft 18. The two electrical machines 14, 16 are then operated in such a way that a torque-free state occurs between the countershaft 18 and a gear pair G2 which is connected to the second planetary gear 12, followed by the gear pair G2 connected to the second planetary gear 12 being disconnected from the countershaft 18. Thereafter the second electrical machine 16 is operated in such a way that a synchronous speed is reached between the second planet wheel carrier 51 and the second sunwheel 32, followed by their being connected together by the second clutch unit 58.

In one embodiment an upshift from one gear to another is effected by the hybrid powertrain being further caused to disconnect the first planet wheel carrier 50 and the first sunwheel 26 from one another. This is achieved by the two electrical machines 14, 16 being operated in such a way that torque balance occurs in the first planetary gear 10. Thereafter the first clutch unit 56 is moved so that the first planet wheel carrier 50 and the first sunwheel 26 are disconnected from one another.

In addition, the second electrical machine 16 is operated in such a way that a synchronous speed is reached between the countershaft 18 and a gear pair G2 which is connected to the second planetary gear 12. Thereafter the gear pair G2 connected to the second planetary gear 12 is connected to the countershaft 18. The two electrical machines 14, 16 are then operated in such a way that a torque-free state occurs between the countershaft 18 and a gear pair G1 which is connected to the first planetary gear 10, followed by the gear pair G1 connected to the first planetary gear 10 being disconnected from the countershaft 18. Thereafter the first electrical machine 14 is operated in such a way that a synchronous speed is reached between the first planet wheel carrier 50 and the first sunwheel 26, followed by their being connected together by the first clutch unit 56.

In a further embodiment, an upshift from one gear to another is effected by the hybrid powertrain further being caused to disconnect the second planet wheel carrier 51 and the second sunwheel 32. This is achieved by operating the two electrical machines 14, 16 in such a way that torque balance occurs in the second planetary gear 12. Thereafter the second clutch unit 58 is moved so that the second planet wheel carrier 51 and the second sunwheel 32 are disconnected from one another.

Thereafter, the second electrical machine 16 is operated in such a way that a synchronous speed is reached between the countershaft 18 and a gear pair G2 which is connected to the second planetary gear 12. Thereafter the gear pair G2 connected to the second planetary gear 12 is connected to the countershaft 18. Thereafter the two electrical machines 14, 16 are operated in such a way that a torque-free state occurs between the countershaft 18 and a gear pair G1 which is connected to the first planetary gear 10, followed by the gear pair G1 connected to the first planetary gear 10 being disconnected from the countershaft 18. The first electrical machine 14 is then operated in such a way that a synchronous speed is reached between the first mainshaft 34 and the output shaft 20, followed by the clutch mechanism 96 being used to connect these two shafts together. In addition, the two electrical machines 14, 16 are operated in such a way that a torque-free state occurs between the countershaft 18 and the previously connected gear pair G2 which is connected to the second planetary gear 12, followed by the gear pair G2 connected to the second planetary gear 12 being disconnected from the countershaft 18. The second electrical machine 16 is thereafter operated in such a way that a torque-free state occurs between the countershaft 18 and the gear pair G3 which is connected to the countershaft 18 and to the output shaft 20. When a torque-free state is reached, the gear pair G3 connected to the countershaft 18 and to the output shaft 20 is disconnected from the countershaft 18. Finally the second electrical machine 16 is operated in such a way that a synchronous speed is reached between the second planet wheel carrier 51 and the second sunwheel 32, followed by their being connected together by the second clutch unit 58.

Figure 4:
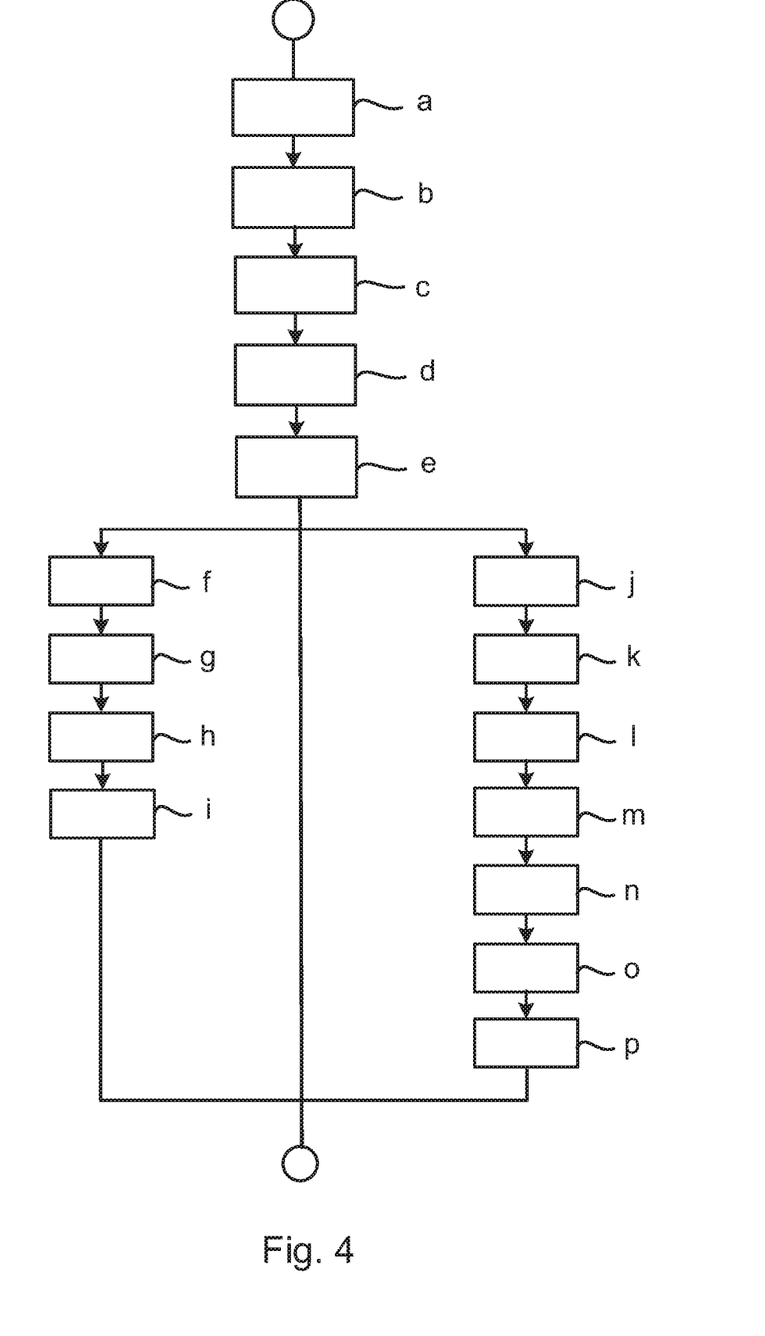
FIG. 4 is a flowchart of a method for controlling a hybrid powertrain according to the present invention.

FIG. 4 is a flowchart of a method for controlling a hybrid powertrain 3 during electric drive. The hybrid powertrain comprises a combustion engine 4 and a gearbox 2 which is provided with an input shaft 8 and an output shaft 20; a first planetary gear 10 connected to the input shaft 8; a second planetary gear 12 connected to the first planetary gear 10; a first electrical machine 14 connected to the first planetary gear 10; a second electrical machine 16 connected to the second planetary gear 12; at least one gear pair G1, 60, 72 connected to the first planetary gear 10 and to the output shaft 20, and at least one gear pair G2, 66, 78 connected to the second planetary gear 12 and to the output shaft 20.

In one embodiment the method comprises the steps of a) using a clutch device 106 to ensure that the combustion engine is disconnected, b) disconnecting rotatable components 28, 32, 51 of the second planetary gear 12 from one another, c) connecting a gear pair G1, 60, 72, which is connected to the first planetary gear 10, d) disconnecting a gear pair G2, 66, 78, which is connected to the second planetary gear 12, and e) connecting two rotatable components 28, 32, 51 of the second planetary gear 12 to one another.

Advantageously, the combustion engine is disconnected from the gearbox by the clutch device 106 situated between an output shaft 97 of the engine and the input shaft 8 of the gearbox.

Advantageously, the rotatable components 28, 32, 51 of the second planetary gear 12 comprise a second planet wheel carrier 51 and a second sunwheel 32, which are disconnected at step b) by the two electrical machines being operated in such a way that torque balance occurs in the second planetary gear 12. Thereafter a second clutch unit 58 is moved so that the second planet wheel carrier 51 and the second sunwheel 32 are disconnected from one another.

Advantageously, the gear pair G1, 60, 72 connected to the first planetary gear 10 is connected at step c) by the first electrical machine 14 being operated in such a way that a synchronous speed is reached between a countershaft 18 and the gear pair G1, 60, 72 connected to the first planetary gear 10, which gear pair is thereafter connected to the countershaft 18.

Advantageously, the gear pair G2, 66, 78 connected to the second planetary gear 12 is disconnected at step d) by the two electrical machines 14, 16 being operated in such a way that a torque-free state occurs between the countershaft 18 and the gear pair G2, 66, 78, which gear pair is thereafter disconnected from the countershaft 18.

Advantageously, the rotatable components 28, 32, 51 of the second planetary gear 12 comprise a second planet wheel carrier 51 and a second sunwheel 32 which are connected together at step e) by the second electrical machine 16 being operated in such a way that a synchronous speed is reached between the second planet wheel carrier 51 and the second sunwheel 32, followed by their being connected together by the second clutch unit 58.

In another embodiment, the method also comprises in addition to the above steps a)-e) the steps of f) disconnecting rotatable components 22, 26, 50 of the first planetary gear 10 from one another, g) connecting a gear pair G2, 66, 78, which is connected to the second planetary gear 12, h) disconnecting a gear pair G1, 60, 72, which is connected to the first planetary gear 10, and i) connecting two rotatable components 22, 26, 50 of the first planetary gear 10 to one another.

Advantageously, the two rotatable components 22, 26, 50 of the first planetary gear 10 comprise a first sunwheel 26 and a first planet wheel carrier 50, which are disconnected at step f) by the two electrical machines being operated in such a way that torque balance occurs in the first planetary gear 10. Thereafter a first clutch unit 56 is moved so that the first planet wheel carrier 50 and the first sunwheel 26 are disconnected from one another.

Advantageously, the gear pair G2, 66, 78 connected to the second planetary gear 12 is connected at step g) by the second electrical machine 16 being operated in such a way that a synchronous speed is reached between the countershaft 18 and the gear pair G2, 66, 78, which gear pair is thereafter connected to the countershaft 18.

Advantageously, the gear pair G1, 60, 72 connected to the first planetary gear 10 is disconnected at step h) by the two electrical machines being operated in such a way that a torque-free state occurs between the countershaft 18 and the gear pair G1, 60, 72, which gear pair is thereafter disconnected from the countershaft 18.

Advantageously, the two rotatable components 22, 26, 50 of the first planetary gear 10 comprise a first sunwheel 26 and a first planet wheel carrier 50 which are connected together at step i) by the first electrical machine 14 being operated in such a way that a synchronous speed is reached between the first planet wheel carrier 50 and the first sunwheel 26, which are thereafter connected together by the first clutch unit 58.

In a further embodiment, the method also comprises in addition to the above steps a)-e) the steps of j) repeating step b), k) connecting a gear pair G2, 66, 78, which is connected to the second planetary gear 12, l) disconnecting a gear pair G1, 60, 72, which is connected to the first planetary gear 10, m) using a clutch mechanism 96 to connect the first planetary gear 10 to the output shaft 20, n) repeating step d), o) disconnecting a gear pair G3, 21 situated between the countershaft 18 and the output shaft 20, and p) repeating step e).

Advantageously, the gear pair G2, 66, 78 connected to the second planetary gear 12 is connected at step k) by the second electrical machine 16 being operated in such a way that a synchronous speed is reached between the countershaft 18 and the gear pair G2, 66, 78, which gear pair is thereafter connected to the countershaft 18.

Advantageously, the gear pair G1, 60, 72 connected to the first planetary gear 10 is disconnected at step l) by the two electrical machines 14, 16 being operated in such a way that a torque-free state occurs between the countershaft 18 and the gear pair G1, 60, 72, which gear pair is thereafter disconnected from the countershaft 18.

Advantageously, the first planetary gear 10 is connected to the output shaft 20 at step m) by the first electrical machine 14 being operated in such a way that a synchronous speed is reached between the output shaft 20 and a first mainshaft 34, which is connected to the first planetary gear 10, followed by the clutch mechanism 96 being used to connect these two shafts together.

Advantageously, the gear pair 3G, 21 situated between the countershaft 18 and the output shaft 20 is disconnected at step o) by the second electrical machine 16 is operated in such a way that a torque-free state occurs between the countershaft 18 and the gear pair G3, 21 situated on the output shaft 20, which gear pair is thereafter disconnected from the countershaft 18.

Figure 5:
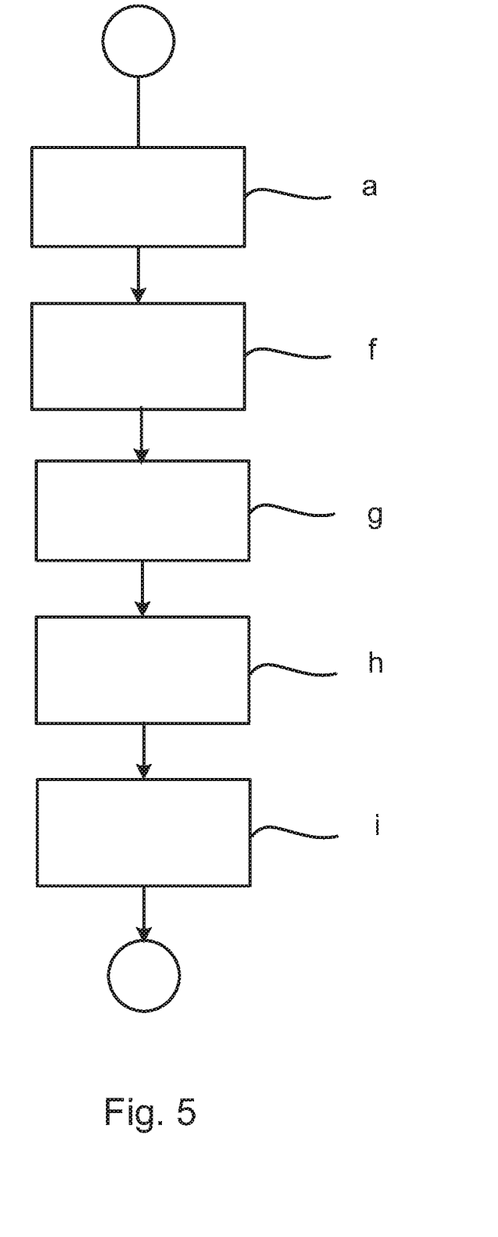
FIG. 5 is a flowchart of a method for controlling a hybrid powertrain according to the present invention.

FIG. 5 is a flowchart of a method for controlling a hybrid powertrain 3 during electric drive. The hybrid powertrain comprises a combustion engine 4 and a gearbox 2, which is provided with an input shaft 8 and an output shaft 20; a first planetary gear 10 connected to the input shaft 8; a second planetary gear 12 connected to the first planetary gear 10; a first electrical machine 14 connected to the first planetary gear 10; a second electrical machine 16 connected to the second planetary gear 12; at least one gear pair G1, 60, 72 connected to the first planetary gear 10 and to the output shaft 20, and at least one gear pair G2, 66, 78 connected to the second planetary gear 12 and to the output shaft 20.

The method comprises the steps of a) using a clutch device 106 to ensure that the combustion engine is disconnected, f) disconnecting rotatable components 22, 26, 50 of the first planetary gear 10 from one another, g) connecting a gear pair G2, 66, 78, which is connected to the second planetary gear 12, h) disconnecting a gear pair G1, 60, 72, which is connected to the first planetary gear 10, and i) connecting two rotatable components 22, 26, 50 of the first planetary gear 10 to one another.

Advantageously, the two rotatable components 22, 26, 50 of the first planetary gear 10 comprise a first sunwheel 26 and a first planet wheel carrier 50 which are disconnected at step f) by the two electrical machines being operated in such a way that torque balance occurs in the first planetary gear 10. Thereafter a first clutch unit 56 is moved so that the first planet wheel carrier 50 and the first sunwheel 26 are disconnected from one another.

Advantageously, the gear pair G2, 66, 78 connected to the second planetary gear 12 is connected at step g) by the second electrical machine 16 being operated in such a way that a synchronous speed is reached between the countershaft 18 and the gear pair G2, 66, 78, which gear pair is thereafter connected to the countershaft 18.

Advantageously, the gear pair G1, 60, 72 connected to the first planetary gear 10 is disconnected at step h) by the two electrical machines 14, 16 being operated in such a way that a torque-free state occurs between the countershaft 18 and the gear pair G1, 60, 72, which gear pair is thereafter disconnected from the countershaft 18.

Advantageously, the two rotatable components 22, 26, 50 of the first planetary gear 10 comprise a first sunwheel 26 and a first planet wheel carrier 50 which are connected together at step i) by the first electrical machine 14 being operated in such a way that a synchronous speed is reached between the first planet wheel carrier 50 and the first sunwheel 26, which are thereafter connected together by the first clutch unit 58.

According to the invention, a computer program P is stored in the control unit 48 and/or the computer 53 and which may comprise routines for controlling the hybrid powertrain 3 according to the present invention.

The program P may be stored in an executable form or in compressed form in a memory M and/or in a read/write memory.

The invention relates also to a computer program product comprising a program code stored on a computer-readable medium for conducting the above method steps when said program code is run on the control unit 48 or another computer 53 connected to the control unit 48. The program code may be stored in a non-volatile way on said medium which can be read by a computer 53.

Cited components and features cited above may within the scope of the invention be combined between different versions cited.

The invention claimed is:

1. A method for controlling a hybrid powertrain, the hybrid powertrain comprising:
   a combustion engine;
   a gearbox with an input shaft and an output shaft, the combustion engine being connectable to the input shaft with a clutch device;
   a first planetary gear connected to the input shaft and a first mainshaft;
   a second planetary gear connected to the first planetary gear and a second mainshaft;
   a first electrical machine connected to the first planetary gear;
   a second electrical machine connected to the second planetary gear;
   at least one gear pair connected to the first planetary gear and to the output shaft; and
   at least another gear pair situated between and connected to the second planetary gear and to the output shaft,
   wherein a planet wheel carrier of the second planetary gear is connected to the second mainshaft, and
   wherein the input shaft is connected to a planet wheel carrier of the first planetary gear,
   the method comprising effecting gear changes without torque brakes by:
   a) disconnecting the combustion engine from the gearbox, and then,
   b) while the combustion engine is disconnected from the gearbox, disconnecting rotatable components of the second planetary gear from one another,
   c) while the combustion engine is disconnected from the gearbox, connecting the at least one gear pair, which is connected to the first planetary gear,
   d) while the combustion engine is disconnected from the gearbox, disconnecting the at least another gear pair, which is connected to the second planetary gear, and
   e) while the combustion engine is disconnected from the gearbox, connecting two rotatable components of the second planetary gear to one another.

2. A method according to claim 1, wherein at step b) the rotatable components of the second planetary gear comprise the planet wheel carrier of the secondary planetary gear and a second sunwheel, and further comprising operating at least the first electrical machine or at least the second electrical machine to balance a torque in the second planetary gear, and then moving a second clutch unit to disconnect the planet wheel carrier of the secondary planetary gear and the second sunwheel from one another.

3. A method according to claim 1, further comprising, at step c), operating the first electrical machine to reach a synchronous speed between a countershaft and the at least one gear pair which is connected to the first planetary gear, and then connecting the at least one gear pair that is connected to the first planetary gear to the countershaft.

4. A method according to claim 1, further comprising, at step d), operating the second electrical machine to reach a torque-free state between the countershaft and the at least another gear pair which is connected to the second planetary gear, and then disconnecting the at least another gear pair connected to the second planetary gear from the countershaft.

5. A method according to claim 1, wherein, at step e), the rotatable components of the second planetary gear comprise the planet wheel carrier of the secondary planetary gear and a second sunwheel, and further comprising operating the second electrical machine to reach a synchronous speed between the planet wheel carrier of the secondary planetary gear and the second sunwheel, and then connecting the planet wheel carrier of the secondary planetary gear and the second sunwheel together by the second clutch unit.

6. A method according to claim 1, further comprising,
   f) disconnecting rotatable components of the first planetary gear from one another,
   g) connecting the at least another gear pair, which is connected to the second planetary gear,
   h) disconnecting the at least one gear pair, which is connected to the first planetary gear, and
   I) connecting two rotatable components of the first planetary gear (10) to one another.

7. A method according to claim 6, wherein at step f) the two rotatable components of the first planetary gear comprise a first sunwheel and the planet wheel carrier of the first planetary gear, and further comprising operating at least the first electrical machine or at least the second electrical machine to balance a torque in the first planetary gear, and then moving a first clutch unit to disconnect the planet wheel carrier of the first planetary gear and the first sunwheel from one another.

8. A method according to claim 6, wherein, at step I), the two rotatable components of the first planetary gear comprise a first sunwheel and the planet wheel carrier of the first planetary gear, and further comprising operating the first electrical machine to reach a synchronous speed between the planet wheel carrier of the first planetary gear and the first sunwheel, and then connecting the planet wheel carrier of the first planetary gear and the first sunwheel together by the first clutch unit.

9. A method according to claim 1, further comprising,
   j) repeating step b),
   k) connecting the at least another gear pair, which is connected to the second planetary gear,
   l) disconnecting the at least one gear pair, which is connected to the first planetary gear,
   m) operating a clutch mechanism to connect the first planetary gear to the output shaft,
   n) repeating step d)
   o) disconnecting a gear pair situated between the countershaft and the output shaft, and
   p) repeating step e).

10. A method according to claim 9, further comprising, at steps g) and k), operating the second electrical machine to reach a synchronous speed between a countershaft and the at least another gear pair, which is connected to the second planetary gear, and then connecting the at least another gear pair connected to the secondary planetary gear to the countershaft.

11. A method according to claim 9, further comprising, at steps h) and l), operating the first electrical machine to cause a torque-free state between the countershaft and the at least one gear pair which is connected to the first planetary gear, and the disconnecting the at least one gear pair connected to the first planetary gear from the countershaft.

12. A method according to claim 9, further comprising, at step m), operating the first electrical machine to reach a synchronous speed between the output shaft and a first mainshaft, which is connected to the first planetary gear, and then connecting the first mainshaft to the output shaft with the clutch mechanism.

* * * * *